United States Patent [19]

Barthe et al.

[11] Patent Number: 4,756,732

[45] Date of Patent: * Jul. 12, 1988

[54] GLASS FIBERIZATION METHOD

[75] Inventors: Marie-Pierre Barthe, Gouvieux; Jean A. Battigelli; Francois Bouquet, both of Rantigny, all of France

[73] Assignee: Isover Saint-Gobain, Paris La Défense, France

[*] Notice: The portion of the term of this patent subsequent to May 29, 2001 has been disclaimed.

[21] Appl. No.: 851,296

[22] Filed: Apr. 7, 1986

Related U.S. Application Data

[63] Continuation of Ser. No. 539,728, Oct. 6, 1983, abandoned, which is a continuation-in-part of Ser. No. 409,336, Aug. 18, 1982, Pat. No. 4,451,276, which is a continuation-in-part of Ser. No. 461,834, Jan. 28, 1983, abandoned.

[30] Foreign Application Priority Data

Apr. 6, 1983 [EP] European Pat. Off. ........... 83400698
Apr. 6, 1983 [EP] European Pat. Off. ........... 83400699
Jul. 12, 1983 [FR] France ............................. 83 11631

[51] Int. Cl.⁴ .......................................... C03B 37/04

[52] U.S. Cl. .......................................... 65/6; 501/35; 501/38

[58] Field of Search ................... 501/35, 38; 65/1-16

[56] References Cited

U.S. PATENT DOCUMENTS 3,928,009 12/1975 Perry ........................................ 65/14
4,058,836 11/1977 Faulkner et al. ........................ 65/6
4,203,747 5/1980 Fezenko .................................... 65/6

Primary Examiner—Robert L. Lindsay
Attorney, Agent, or Firm—John T. Synnestvedt; Richard D. Weber

[57] ABSTRACT

Glass fibers for insulation uses are produced by means of a centrifugal spinner which introduces glass streams into an annular attenuating blast adjacent the periphery of the spinner. An improved product quality and/or production rate as well as prolonged spinner life are obtained by selection and utilization of a novel combination of structural and operating parameters characterized in particular by a spinner diameter and peripheral speed substantially greater than conventionally employed.

4 Claims, 5 Drawing Sheets

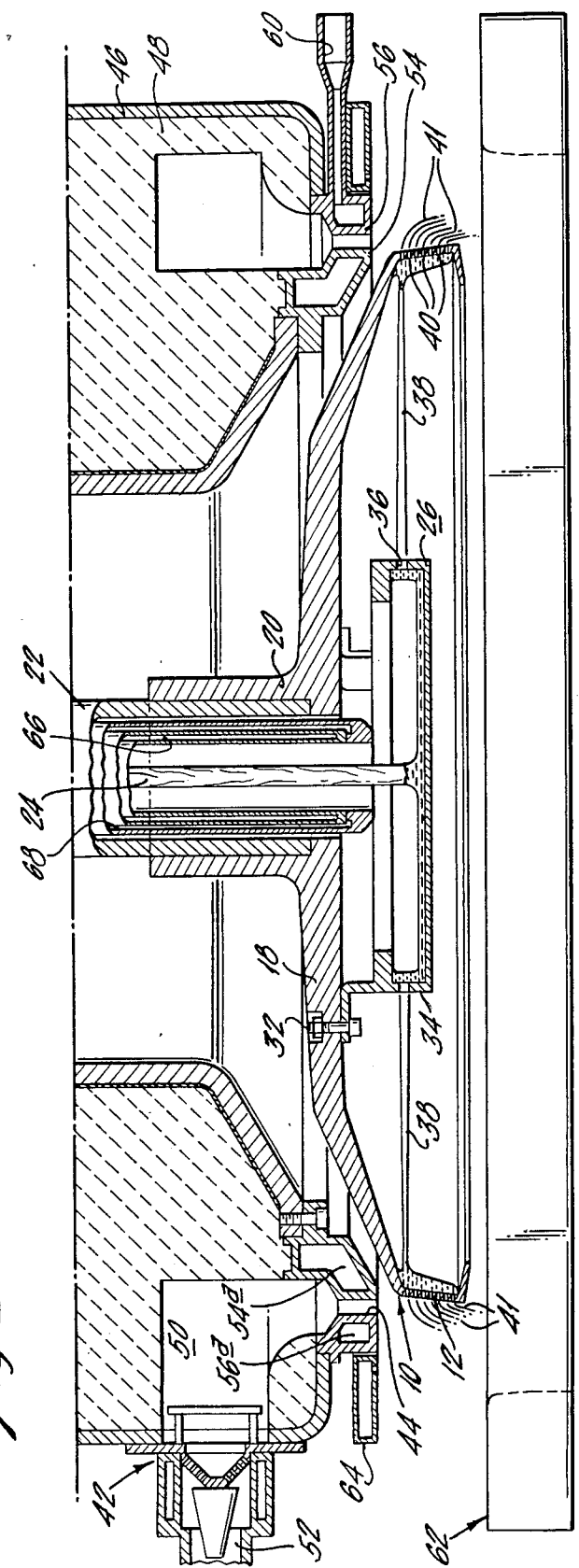

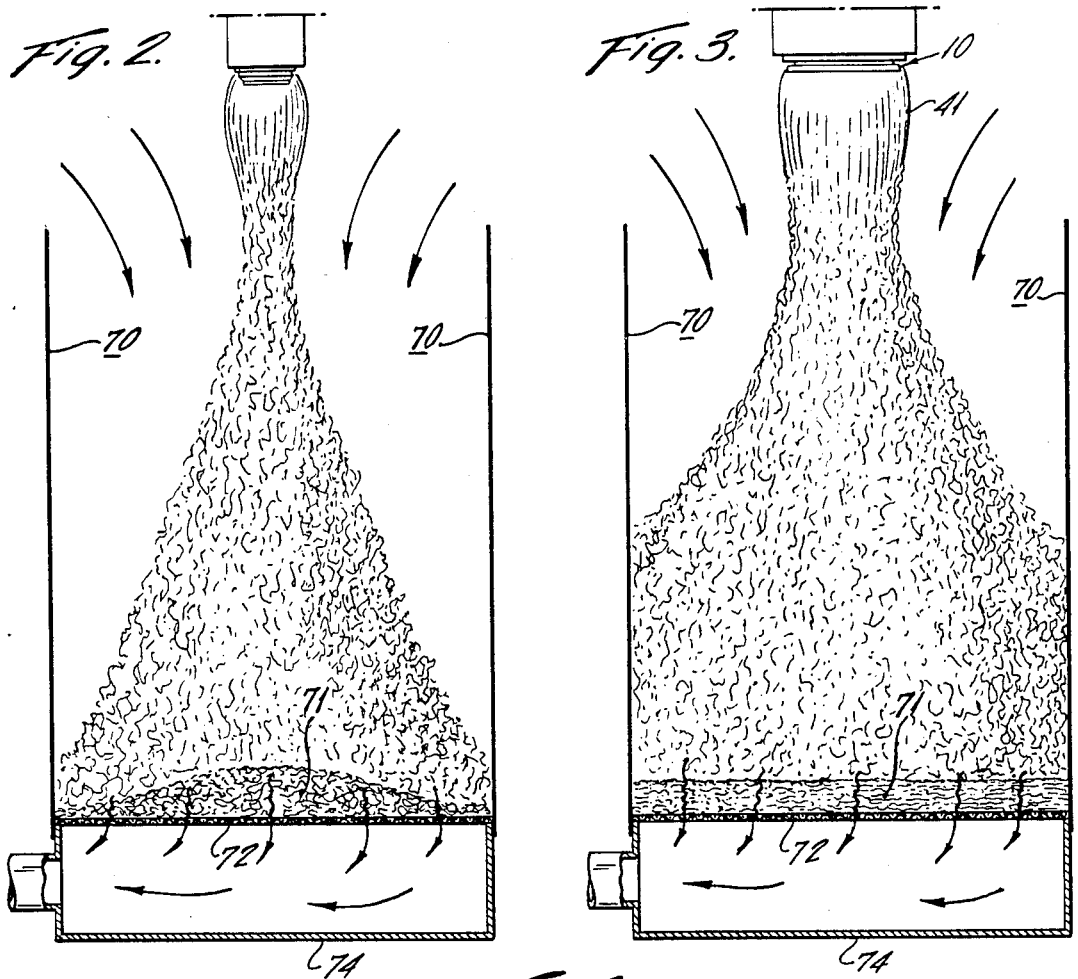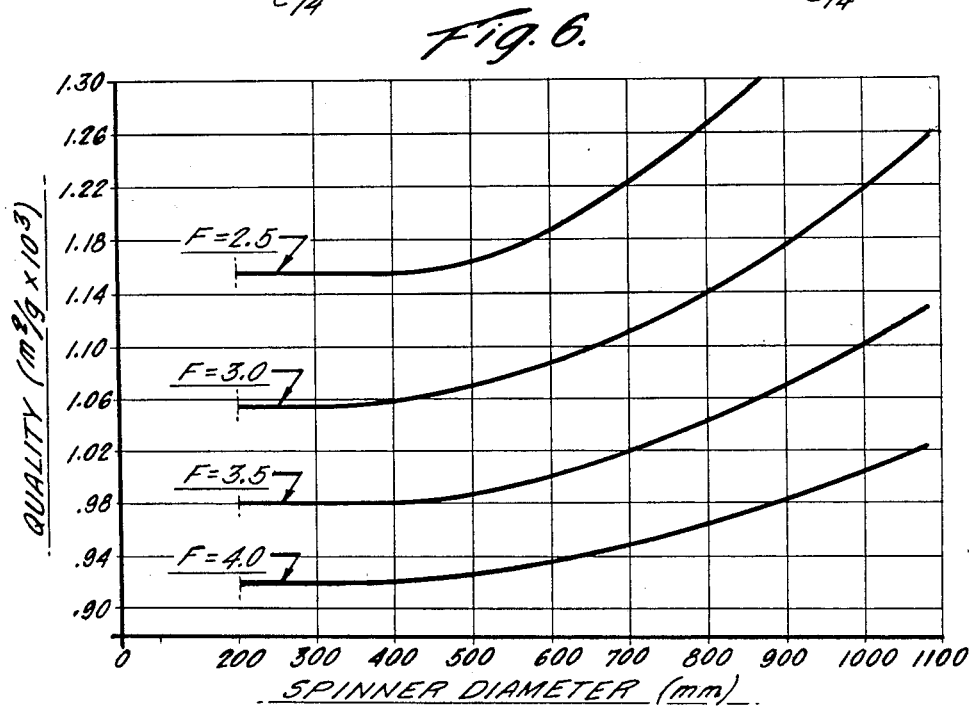

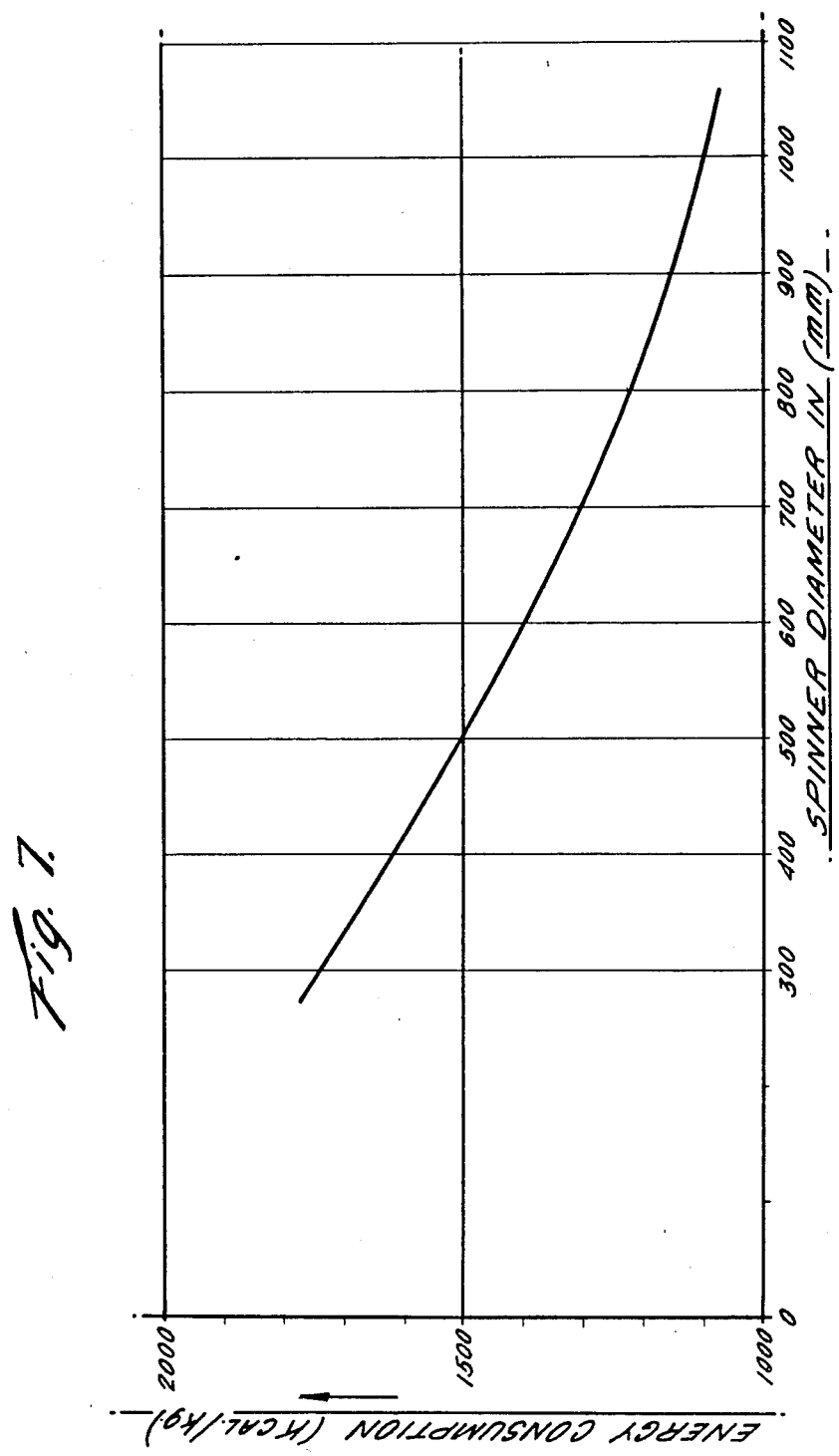

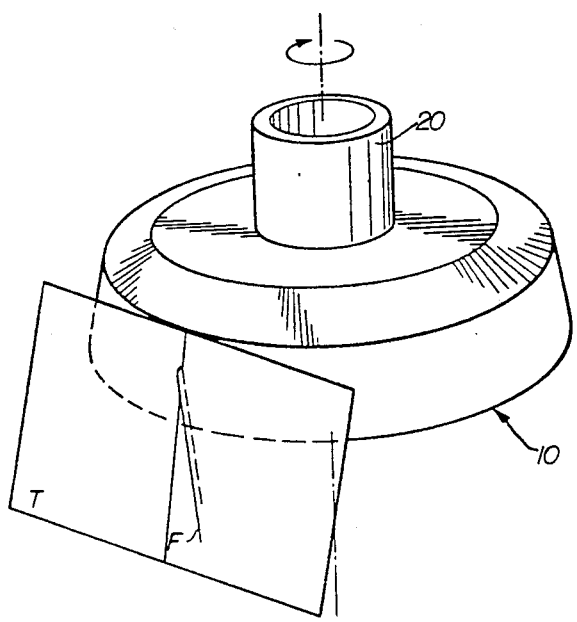
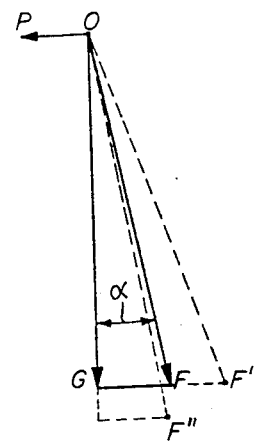
Fig. 8.
Fig. 9.

GLASS FIBERIZATION METHOD

CROSS REFERENCE TO RELATED APPLICATION

The present application is a continuation of our prior application Ser. No. 539,728, filed Oct. 6, 1983, now abandoned which is a continuation-in-part of our prior applications Ser. No. 409,336, filed Aug. 18, 1982 now U.S. Pat. No. 4,451,276 granted May 29, 1984 and Ser. No. 461,834, filed Jan. 28, 1983 abandoned.

BACKGROUND OF THE INVENTION

1. Field of the Invention

The present invention relates generally to the fiberization of glass or other thermoplastic materials and relates more particularly to fiberization techniques wherein the molten material to be fiberized is centrifugally converted by a rapidly rotating spinner into a multiplicity of glass streams which are attenuated into fibers by a concentric annular gaseous blast from an internal combustion burner adjacent the periphery of the spinner directed perpendicularly to the centrifugal stream, such a fiberization technique being herein referred to as "centrifugal blast attenuation". The fibers, after being sprayed with a binder, are collected on a foraminous conveyor in the form of a blanket or mat, which is then passed through a curing oven.

2. Description of Prior Art

The centrifugal blast attenuation glass fiberization technique generally described above has been used industrially for many years in the production of glass fiber insulation products, and a substantial percentage of glass fiber insulation manufactured at the present time is produced utilizing this technique. Details of various forms of this process are disclosed for example in U.S. Pat. Nos. RE 24,708 2,984,864, 2,991,507, 3,007,196, 3,017,663, 3,020,586, 3,084,381, 3,084,525, 3,254,977, 3,304,164, 3,819,345 and 4,203,745.

In carrying out this technique, substantial amounts of heat energy are required, first for heating the glass into a molten state, and secondly for producing the attenuating blast. The uncertain availability and high cost of energy have created an increasing demand for glass fiber insulation products, while the same factors have caused a substantial increase in the cost of producing such products.

Efforts have accordingly been made to improve the efficiency of the described fiberization process or to utilize alternate fiberization techniques. For example, some glass fiber production has in recent years been carried out utilizing a purely centrifugal fiber attenuation, primarily to avoid the energy requirements of the blast attenuation technique. Such a process is disclosed for example in U.S. Pat. No. 4,058,386.

Centrifugal stream formation coupled with blast attenuation as generally described above remains a preferred technique however, both because of the excellent quality of the fiber blanket obtained therewith as well as the fact that a substantial portion of the insulation industry is equipped at present with apparatus for carrying out such a process. It accordingly follows that any improvement in this technique would be of significant industrial importance. As will be understood from the following disclosure, the present invention provides marked improvements in centrifugal blast attenuation fiberizing techniques with respect to product quality, production rate, and operating costs.

Inasmuch as glass fiberization is in practice an extremely complex technique characterized by a large number of variable parameters, many of the details of known techniques need not be included herein, reference being made to the above patents for such disclosures. However, certain limited aspects of the prior art will be considered, especially concerning those factors respecting which the present invention departs substantially from prior practice.

Among the many variables to be considered, the construction of the spinner and the speed at which it rotates are of particular importance in successfully carrying out a centrifugal fiberization process. In addition, the diameter of the spinner, the size, number and arrangement of the orifices in the peripheral spinner wall, the alloy from which the spinner is made as well as the shape of the spinner wall, the distribution of molten glass to the interior spinner wall and the control of the temperature of various portions of the spinner assembly and the glass flowing therewithin are factors which must be carefully considered.

In the centrifugal blast attenuation process, the blast temperature and velocity, as well as the placement of the blast nozzle and direction of the blast with respect to the spinner wall are important to an optimization of the fiber attenuation. Spinner life is an important factor, particularly in view of the relatively short life of this type of spinner and the extremely high cost of spinner replacement.

The spinners used in early centrifugal blast attenuation equipment were typically of a diameter of about 200 mm and the peripheral wall thereof included typically 4,000 to 6,000 holes through which the molten glass passed to form the primary glass streams subjected to attenuation by the annular blast. It was perceived at an early date that for a spinner of given size and construction, the output or pull rate, conventionally expressed in terms of the weight in tons per day of produced fiber, could be increased only at the expense of a corresponding decrease in fiber quality. It was further perceived that there were practical limits to the pull rate per spinner orifice for maintaining acceptable fiber quality, the maximum rate per orifice ranging between about 1 and 1.4 Kg/day. Nonetheless, the economic demands for increasing production of a given line usually resulted in an increase in pull rate despite the deterioration in product quality. The term "quality" in this sense refers to the product weight per unit of area for a given thermal resistance and nominal product thickness. A lower quality product would hence be a heavier product although with the same insulating value as the better quality product. The lower quality product is thus lower in quality not only since it has a higher density, but also in the sense that it is inherently a more expensive product, requiring more glass for a given area, and is thus more costly to manufacture.

In an effort to increase the output of a spinner of given diameter, the number of holes in the peripheral wall of the spinner was increased. Although some increase in pull rate was achieved, there are practical limits of orifice density controlled by factors such as the necessity of maintaining discrete glass streams emerging from the periphery of the spinner and manufacturing problems. Similar considerations limit the degree to which the spinner peripheral wall can be increased in height to increase its area.

Since the pull rate per orifice, orifice density, and height of the spinner wall could not be further increased without sacrificing fiber quality below acceptable limits, efforts to increase the pull rate were directed toward increase of the spinner diameter, initially to 300 mm and more recently to 400 mm. Although each such increase in diameter produced some increase in pull rate and/or an improvement in fiber quality, the improvements were modest in comparison with those of the present invention.

Another limiting factor is the centrifugal acceleration produced by the high rate of spinner rotation. Although substantial centrifugal forces are required to produce the necessary flow of molten glass through the spinner orifices and to thereby form the primary glass streams, high centrifugal forces foreshorten the life of the spinner.

Since spinner life is substantially inversely proportional to the spinner centrifugal acceleration forces, it has heretofore been considered desirable to restrict rotational speeds of the spinner as much as possible in an effort to extend the spinner life.

Due to the detrimental effects of higher centrifugal acceleration on spinner life and the uncertain effects of higher peripheral speeds on fiber attenuation, the conventional wisdom when increasing spinner diameter has been to decrease or refrain from increasing the centrifugal acceleration and to hold peripheral velocity within a range known to give satisfactory attenuation.

A further factor is of importance, namely the fineness (average diameter) of the fibers. It is well established that for a given density of fiber mat layer, the finer the fibers, the greater the thermal resistance of the layer. An insulating product comprising finer fibers can accordingly be thinner with the same insulating value as a thicker product of coarser fibers. Or, likewise, a product of finer fibers can be less dense than one of coarse fibers of the same thickness and have the same insulating value.

Since sales of insulation products are usually based on a guaranteed thermal resistance (R value) at a nominal thickness, the fiber fineness is an important factor determining the weight of the product per unit of area, known as the basis weight, a product of finer fibers having the lower basis weight and hence requiring less glass and enjoying manufacturing economies.

From an economic standpoint, however, fiber fineness, as with other factors, is normally considered to be a compromise since the attainment of finer fibers is thought to flow principally from higher blast velocities and from the use of softer glass compositions. Increasing the blast velocity results in a direct increase in energy costs, and softer glasses typically require ingredients which are expensive and which, further, usually have undesirable pollutant characteristics.

Fineness, which can be expressed in terms of fiber diameter, in microns, representing the arithmetic mean value of measured fiber diameters, is also conveniently expressed on the basis of a fiber fineness index, or a "micronaire" determination, the latter being a standard measuring technique in the glass wool industry wherein a predetermined mass or sample, for example 5 grams of the fibers, is positioned within a housing of a given volume so as to form a permeable barrier to air passing through the housing under a predetermined pressure and the measurement is made on the air flow through the sample. The measurement thus made depends on the fiber fineness.

In general, the finer the fibers the more resistance offered to the passage of air through the sample. In this manner an indication is given of the average fiber diameter of the sample. The fineness of typical blast attenuated centrifugal glass fiber insulation products ranges from fine types (i.e. micronaire 2.9 (5 g); average diameter 4 $\mu$m) to relatively coarse types (i.e. micronaire 6.6 (5 g); average diameter 12 $\mu$m).

The insulating value of a blanket of fibers is dependent to a limited although significant degree on the lay-down of the fibers on the collecting conveyor, which determines the orientation of the fibers in the insulation product. The thermal resistance of a fiber blanket will vary depending on the direction of orientation of the fibers to the measured heat flow, the resistance being greater when the fibers are oriented perpendicular to the direction of heat transfer. Accordingly, to maximize the thermal resistance of an insulating blanket, the fibers should be oriented to the maximum degree possible in an attitude parallel to the collecting conveyor and the plane of the blanket formed thereon. Because of the extreme turbulence generated above the collecting conveyor by the decelerating fibers and gaseous currents, there is very little that can be done to control the orientation of the fibers, most efforts in this area of the fiberizing process being directed toward achieving a relatively uniform distribution of fibers across the width of the conveyor.

In an effort to increase fiber production still further while maintaining or possibly improving the quality of the fibers, experiments were undertaken with still larger spinners having diameters of 600 mm and over. Surprising improvements in pull rate and/or quality were achieved although for reasons some of which at the present time are not entirely clear. Particularly unexpected were improvements in the fiber quality which exceeded forecasts by 10–25% depending on the pull rate utilized.

In making the transition to the large size spinner, the spinner rotational speed was reduced to provide centrifugal accelerating forces on the glass and spinner wall within conventional limits such that the glass feed through the orifices, as well as the stresses placed on the spinner wall structure, would not depart significantly from prior practice. It was feared that the larger spinner diameter would, at the rotational speed necessary to produce such centrifugal force, result in an unacceptably high peripheral speed of the spinner with a consequent degradation of fiber formation and attenuation. Surprisingly, the fiberization was not adversely affected by the higher peripheral speed, but, to the contrary, was actually improved as evidenced by the improved fiber quality and/or pull rate as compared with lower peripheral speeds. Furthermore, it has been found that the larger spinner diameter significantly improves the operating economy of the system.

BRIEF SUMMARY OF THE INVENTION

The present invention in summary comprises techniques including both method and apparatus for producing glass fibers, and fibrous insulation blanket or mat made therefrom.

The present method contemplates a peripheral spinner velocity substantially higher than heretofore conventionally employed and preferably in the range of about 50 m/s to about 130 m/s.

The apparatus includes means for supplying a stream of molten glass to the spinner for centrifugal delivery to the interior surface of the peripheral spinner wall. This wall includes a plurality of orifices through which the molten glass passes and forms a multiplicity of streams. The invention contemplates formation of fibers from the centrifugally delivered streams by the use of gas blast attenuation.

The technique of the invention includes an internal combustion burner providing a downwardly directed annular blast adjacent the spinner wall to attenuate the glass streams into fibers. The fibers are delivered downwardly into a receiving hood or receiving chamber and are collected on a substantially horizontal foraminous conveyor disposed at the bottom of the receiving chamber.

Although the improved fiberization achieved with the higher spinner peripheral speed is obtainable with spinners of conventional size, it has been found that a substantially increased pull rate and hence increased operating economies can be achieved with a substantial increase in spinner diameter. It is accordingly preferred that higher spinner peripheral speed be employed in conjunction with a spinner of increased diameter in carrying out the present invention. To achieve improved operating economies, the spinner diameter should be substantially greater than 500 mm and preferably within the range of from about 600 mm to 1500 mm.

The invention is further directed to a glass fiber insulation blanket or mat having improved insulation quality, in addition to other improved mechanical properties.

Although efforts have been undertaken to isolate the principal factors responsible for the improved performance obtained with the higher spinner peripheral velocity and the larger spinner diameter, at the present time these efforts have not been conclusive. Such theoretical explanations as are set forth in this specification must be recognized to be tentative, subject to further experimental verification, and not taken to be limiting. The following disclosure will present a detailed description of the apparatus and process utilized in obtaining the improved performance as well as a description of the improved product obtained thereby.

BRIEF DESCRIPTION OF THE DRAWINGS

FIG. 1 is a partial sectional elevational view showing a spinner assembly and burner in accordance with the present invention;

FIG. 2 is a schematic elevational view showing the operation of a conventional small diameter spinner and fiber collecting conveyor, the view being taken transversely through the conveyor and illustrating the uneven distribution and random orientation of fibers on the conveyor in the absence of fiber distribution means;

FIG. 3 is a view similar to FIG. 2 but employing a large diameter spinner operating in accordance with the invention showing the relatively uniform distribution and relatively uniform orientation of fibers on the conveyor in the absence of fiber distribution means;

FIG. 6 is a graph showing fiber quality plotted against spinner diameter for fibers of various degrees of fineness;

FIG. 7 is a graph showing energy consumption plotted against spinner diameter for fibers produced at constant centrifugal acceleration;

FIG. 8 is a diagrammatic perspective view of a spinner and the path of the fiber formed at the periphery thereof; and FIG. 9 is a view illustrating the projection of the path of the fiber in FIG. 8 into the plane tangential to the spinner.

DESCRIPTION OF THE PREFERRED EMBODIMENT

Figure 4:
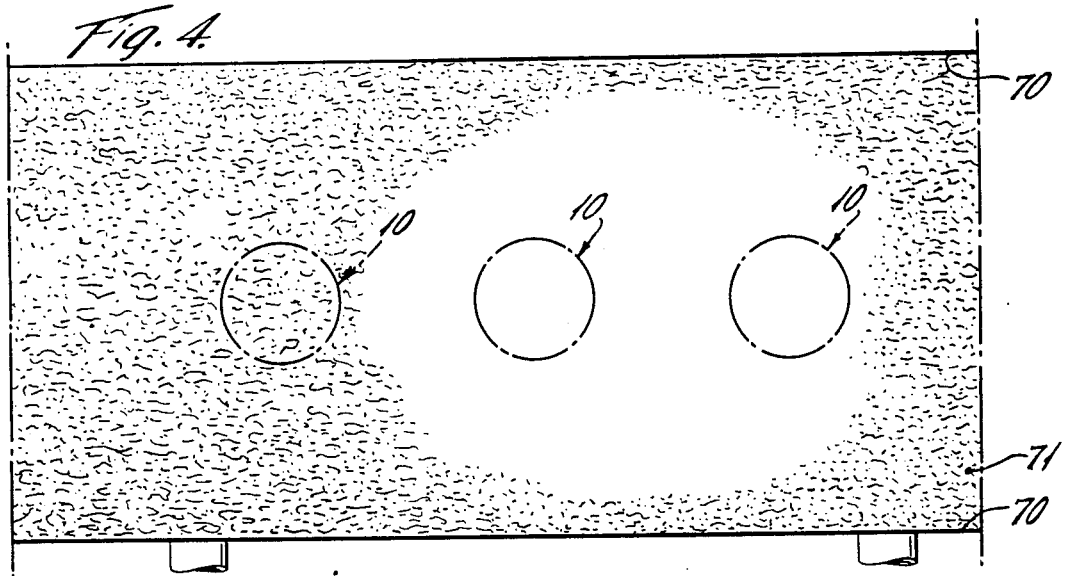
FIG. 4 is a schematic plan view showing a plurality of spinners and their arrangement with respect to the conveyor.

Referring to the drawings and particularly FIG. 1 thereof, a fiberizing station in accordance with the present invention is illustrated including a spinner 10 having a peripheral wall 12 and a support plate 18. The spinner 10 is mounted by means of a hub portion 20 to a substantially vertical shaft 22. The shaft 22 is rotatably supported in a well known manner by suitable bearings attached to a supporting frame and is driven in rotation at a relatively uniform predetermined speed by an electric motor and belt drive. The shaft support and drive details are conventional and accordingly are not illustrated.

The shaft 22 is hollow, permitting a stream of molten glass 24 to pass downwardly therethrough into a basket 26 supported beneath the lower end of the shaft by bolts 32.

The basket 26 comprises a substantially cylindrical wall 34 having a plurality of orifices 36 through which the molten glass passes under the influence of centrifugal force in streams 38 which are directed onto the interior of the spinner wall 12. A multiplicity of orifices 40 in the peripheral wall 12 of the spinner serve to form a multiplicity of molten glass streams 41 as the molten glass is forced through the orifices by the centrifugal force acting thereon.

As discussed hereinafter, the diameter of the spinner, the size and density of the orifices 40, as well as the speed of rotation of the spinner are parameters important to the fiberizing process.

An annular internal combustion burner 42 of substantially conventional construction is disposed above the wall of the spinner and includes an annular blast nozzle 44 spaced above the spinner peripheral wall 12 so as to direct an annular blast downwardly adjacent the spinner wall 12 to intercept and attenuate the multiplicity of glass streams 41 issuing from the orifices 40. The burner 42 includes a metal casing 46 enveloping a refractory liner 48 defining an annular combustion chamber 50 into which an air-fuel mixture is introduced at inlet 52. The blast nozzle 44 communicates with the combustion chamber 50 and is formed by inner and outer nozzle lips 54 and 56. The blast nozzle lips 54 and 56 respectively include internal cooling channels 54a and 56a into which a cooling liquid such as water is introduced by inlet 60 for circulation to an outlet (not shown).

In order to maintain the heat content of the spinner and fibers during attenuation, a high frequency induction heating ring 62 is provided just below the spinner in concentric relation thereto and having an internal diameter somewhat larger than the spinner to avoid interference with the downward flow of fibers entrained by the annular blast.

An auxiliary blast is generated by an annular blowing crown 64 disposed outboard of the blast nozzle lips and connected to a source of pressurized gas such as air, steam or combustion products.

The hollow shaft 22 includes several fixed concentric internal tubes. The innermost pair of these tubes defines an annular cooling passage 66 through which cooling water is circulated while the outermost pair define an annular passage 68 through which a combustible mixture can be passed and ignited to preheat the basket 26 prior to startup of the spinner.

Figure 5:
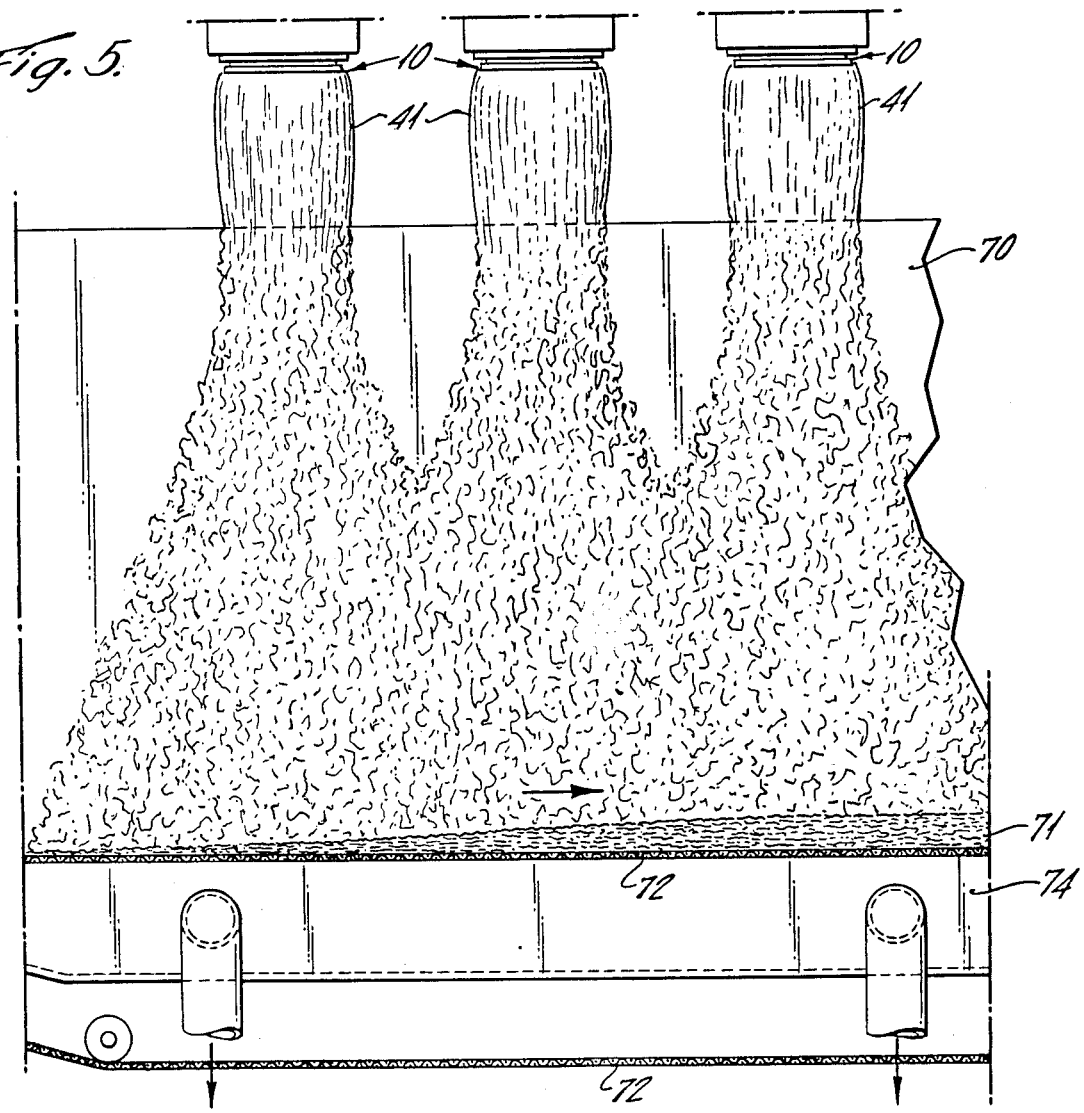
FIG. 5 is a schematic elevational view of the apparatus shown in FIG. 4.

The fibers generated by the spinner and the gaseous blast pass downwardly into a receiving chamber or receiving hood 70 and are thence deposited in the form of a blanket 71 on a foraminous conveyor 72 as shown schematically in FIGS. 2, 3 and 5. A suction box 74 beneath the conveyor withdraws the high volume of gases passing through the conveyor in a conventional manner.

As shown in FIGS. 4 and 5, a plurality of fiberizing stations each having a spinner 10 are conventionally employed for the production of the blanket 71 and in the preferred form of the invention are arranged in a line along the longitudinal axis of the conveyor 72. The number of spinners directing fibers onto a conveyor in an industrial installation might typically be six to ten spinners or more.

For operation of the described apparatus, the spinner 10 including the basket 26 thereof is preheated in a well known manner utilizing the combustion of gases passing through passage 68, the heat of the burner 50 and heating ring 62 and similar supplemental sources as may be necessary.

With the spinner rotating at a predetermined speed and the burner adjusted to provide a combustion chamber pressure resulting in a blast velocity sufficient to provide the desired attenuation and fineness of the fibers, the molten glass stream 24 is introduced into the hollow spinner shaft 22 from a forehearth or other source of molten glass disposed above the spinner assembly. The stream of molten glass upon reaching the basket 26 flows along the bottom of the basket under the influence of centrifugal force and passes through the orifices 36 of the basket in the form of glass streams 38 which are directed onto the upper portion of the spinner peripheral wall 12.

Under the influence of the stronger centrifugal force exerted at the wall 12, the glass passes through the multiplicity of small orifices 40 and issues at the exterior of the peripheral wall in the form of a multiplicity of streams 41 which are immediately subject to the attenuating effect of the blast from the internal combustion burner 50 directed across the exterior of the wall. The glass streams 41 are maintained in an attenuable condition by the elevated temperature of the blast for a time sufficient to effect attenuation thereof. The fineness of the attenuated fibers is regulated primarily by the control of the blast velocity which in turn is a function of burner pressure. An increase in burner pressure and blast velocity will result in a greater attenuation and hence finer fibers.

The flow of attenuated fibers into the receiving chamber or receiving hood 70 as shown in FIGS. 3 and 5 is accompanied by the induction of substantial amounts of air as shown by the arrows at the top of the receiving chamber. Although the induced air tends initially to restrict the expansion of the veil of fibers flowing from the spinner, the rapid deceleration of the fibers within the receiving chamber produces a substantial expansion of the fiber veil and, for reasons discussed in more detail herebelow, provides a relatively uniform distribution of the fibers amid the product and across the width of the conveyor. Furthermore, due to a diminution of the turbulence usually present in the conveyor region, the invention produces a more favorable orientation of the fibers during the formation of the fiber blanket with a resultant improvement of the thermal properties of the blanket.

Although a binder spray is applied to the attenuated fibers at the top of the receiving chamber in a conventional manner, the showing of the apparatus for applying the binder has been omitted in FIGS. 2-5 to simplify these figures.

The spinner peripheral velocity and the diameter of the spinner are important factors in the present technique.

The largest spinners in industrial use in centrifugal blast attenuated processes have heretofore had a diameter on the order of 400 mm and a peripheral velocity of approximately 44 m/s. An increase in spinner diameter and peripheral velocity had not been deemed feasible, even if centrifugal acceleration were not increased. Peripheral velocity increases were thought to present difficulties in fiber attenuation. In addition, difficulties with the life of the spinner were anticipated.

It has been discovered, however, that substantial increases in spinner diameter and peripheral velocity have no adverse effects on fiberization, and in fact, produce fiber of improved quality when operated at the same pull rate per spinner as the 400 mm sized spinner. For example, a spinner of 600 mm in accordance with the present invention can be operated at a pull rate about 50% higher than a 400 mm spinner while producing the same quality fiber. The economic advantages of such an improvement are evident, particularly when it is considered that the output of a given production line can be increased by at least 50% utilizing the invention with modifications requiring a capital outlay in a typical situation of less than 3% of the cost of a new production line.

Considering further the factor of spinner diameter, excellent results have been achieved utilizing a spinner of 600 mm diameter and substantially larger spinners can be used. The benefits of the invention can be attained with spinners having a diameter substantially in excess of 500 mm and within the range of about 550 mm to about 1500 mm. The preferred range of spinner diameter is 600 mm to 1000 mm.

It has been found that fiberization and hence fiber quality is generally improved with increased peripheral speed and increased centrifugal acceleration, although the latter is detrimental to spinner life. By selecting a spinner rotational speed providing centrifugal acceleration forces not significantly departing from those conventionally utilized in smaller spinners, for example within the range of about 8,000 to 14,000 m/s$^2$, the peripheral speed with the larger size spinners would be significantly higher than that conventionally employed with smaller spinners with a resultant improved fiber quality. The spinner life would not be decreased, the larger spinners experiencing substantially the same centrifugal forces as the smaller conventional spinners. For example, with a 600 mm spinner operating at a speed producing a centrifugal acceleration of 10,600 m/s$^2$, the peripheral speed would be 56.5 m/s, substantially higher than the peripheral speed of 46 m/s of the conventional 400 mm spinner operating at the same centrifugal acceleration.

The present invention contemplates a rotational speed of the spinner which, taking account of the preferred range of spinner diameters as described above, would produce a centrifugal acceleration at the spinner peripheral wall within the range of about 4,000 to about 20,000 m/s² and a peripheral speed ranging substantially between about 50 and about 130 m/s. It is expected that the centrifugal acceleration would in practice range between about 6,000 to about 16,000 m/s², particularly in view of the improvement in fiber quality noted within this latter range. Since fiber quality improves with increasing centrifugal acceleration and peripheral speed, the only detriment to operating toward the upper end of the above ranges is the reduced spinner life.

Although in the preferred form of the invention, increased spinner peripheral velocity is employed in conjunction with spinners of substantially larger diameter, the higher spinner peripheral velocity is beneficial even with spinners of conventional size in achieving improved fiberization. Similarly, spinners of large diameter in accordance with the invention can produce operating economies and/or an improved quality fiber even when operated at conventional speeds.

The improvements flowing from the larger spinner diameter will next be considered.

The graph of FIG. 6 illustrates the operation of spinners of various sizes, at a substantially constant centrifugal acceleration of about 10,000 m/sec². It is to be noted that fiber quality, for fiber finenesses of 2.5, 3.0, 3.5 and 4.0 (under 5 grams), significantly and sharply improves, as is graphically shown by the distinct change in the angle of curvature, at spinner diameters substantially in excess of 500 mm. Since the curves begin to increase substantially only above 400 mm, the improvements would not have been predictable from the results obtained with prior art.

The improvement in fiber quality is particularly substantial with the use of large spinners in making fine fibers. For a fiber having a micronaire of 2.5 (5 g), for example, it has been confirmed that by changing from a 400 mm spinner to a 600 mm spinner, a reduction in weight of the order of 5% can be attained.

Another factor having an important bearing on fiber production is the burner pressure, the control of which directly affects the fiber fineness and on which also depends the energy consumption of the process.

Utilizing a burner of the type shown in FIG. 1, the burner pressure should range between about 100 and about 900 mm water column with a preferred pressure range of 200 to 600 mm water column. For reasons not totally understood, the required burner pressure necessary to produce a fiber of a certain fineness decreases with increasing spinner diameter, even though the centrifugal acceleration is not increased. This factor is considered to be the cause of the improved fiber quality as well as the energy saving noted with the larger spinners since the lower burner pressure results in longer fibers with less fiber breakage.

The results of the research carried out by the inventors on this subject, and which is summarized in FIG. 7, shows a great decrease in the energy consumed when the diameter of the spinner increases. The curve shown on this graph is for a constant acceleration of 10,000 m/s². In these experiments the density of the orifices on the spinner walls, the dimensions of the orifices, the pull per orifice and the fineness of the fibers produced are identical.

The graph of FIG. 7 corresponds to the production of very fine fibers, micronaire 3 (5 g). It is established in particular that under the conditions of the invention, in other words with the spinners having a diameter greater than 500 mm, the consumption of heat is less than 1500 kcal/kg whereas it is for example 1750 kcal/kg with fibers produced using a spinner with a diameter of 300 mm.

Since the heat consumption for the formation of the gaseous attenuating blast represents most of the energy consumed in producing the fibers, at least 4/5ths of the total, reduction in this consumption has a very substantial effect on the fiber production cost.

Although the thermal consumption values correspond to the same quality of fibers, the quantities produced are not the same. Thus, for conditions which allow the same quality of fibers to be obtained, spinners 300, 400, and 600 mm in diameter produce respectively 10, 13.5 and 20 metric tons of fibers per day. The economies in consumption are therefore in addition to the economies provided by the increase in production rate.

The width of the burner nozzle 44 preferably is within the range of about 5 mm to about 20 mm with a preferred width of about 8 mm. The burner temperature preferably ranges between about 1300° C. and 1700° C. with a preferred temperature of about 1500° C.

With spinners contemplated by the present invention, it has been found that an improved distribution of the fibers on the conveyor as well as an improved orientation of the fibers within the blanket can be obtained.

Measurements were made on products obtained according to the prior technique and products obtained with the technique of the present invention.

There are several methods of measuring the fiber distribution within the interior of a product. One of the simplest ones involves cutting the product into a series of small parallelipipeds or "cubes" (for example of 25×25×45 mm in size) which are individually weighed. The different weights, which can be expressed in local densities related to the center of gravity of each "cube", give a three dimensional picture of the distribution. To facilitate the comparisons the coefficient of variation $C_v$ of the distribution is calculated by the quadratic differential (square root of the mean value of the differentials squared) to the mean value of the weight of the "cubes".

Utilizing this method of measuring distribution, a very significant differential was found between a product obtained with the prior technique ($C_v=6.1\%$) and that obtained with the technique of the present invention ($C_v=2.6\%$). This shows a very substantial improvement in the fiber distribution in the products prepared in accordance with the invention.

In the example of the invention illustrated in FIG. 3, the relatively large diameter of the spinner results in a veil of fibers which expands before reaching the conveyor and the width of which is greater than the width of the conveyor, the fibers around the edge of the veil at each side of the conveyor encountering the sides of the receiving hood 70 and being redirected inwardly to produce a blanket 71 of relatively uniform thickness. The lay-down of the fibers occurs with a minimal amount of turbulence and accordingly results in a fiber orientation predominately parallel to the direction of the conveyor.

In contrast, an example of the prior art is shown in FIG. 2 wherein the fiber veil is seen to be too narrow to reach the walls of the receiving hood and, as a result, due to the typical concentration of fibers in the center of the veil, the blanket is nonuniform, being disproportionately thick in the center and thin at the sides. Furthermore, in contrast to the lay-down of the fibers with the larger spinner shown in FIG. 3, a substantial turbulence occurs around the edge of the veil proximate the conveyor, which turbulence results in a disorganized lay-down of the fibers, the fiber orientation being substantially less parallel to the conveyor than that produced with the present apparatus and method.

Because of the poor distribution attainable with the conventional smaller spinners operating under conventional parameters, various auxiliary means have been employed in an effort to improve the fiber distribution.

With the wide conveyors it is possible to place transversely two, three or more fiberizing units in a transverse direction to the conveyor. However, even if theoretically this arrangement enables a uniform distribution, it presents the major disadvantage that for any stoppage of a single unit of the row, for example to change the spinner, the disorganization of the distribution resulting from this stoppage leads to the rejection of the product formed by all the other units during the span of the intervention. For this reason it is generally preferable to arrange the fiberizing units in a single line longitudinally to the conveyor, since, in this case, any stoppage of a unit would not appreciably alter the distribution and it would be possible to continue to produce, although at a lower rate.

With the units arranged in this manner, various types of auxiliary distribution means are employed in an effort to improve the fiber distribution. These distribution means include for example jet nozzles in the side of the receiving hood (U.S. Pat. No. 3,030,659), oscillating or alternately fed blower rings, baffles controlling induced air (U.S. Pat. No. 3,255,943), oscillating conduits for the fiber veils (U.S. Pat. No. 3,830,638) and the oscillation of the spinner assembly (U.S. Pat. No. Re. 30,192). Although such devices may achieve an improved fiber distribution, they generally introduce even more turbulence into the receiving chamber, thereby causing an even less favorable orientation of the fibers in the blanket. Since the fiber orientation is extremely important in a fiber insulating medium, with a fiber orientation parallel to the conveyor providing improved thermal resistance characteristics, it can be understood that the larger veil produced by the large spinners in accordance with the invention is an important factor in optimizing the quality of the fibrous blanket. Furthermore, the expense of auxiliary distribution devices and the cost of their operation can be minimized or eliminated with the present invention. The shape of the veil of fibers directly beneath the spinner can be seen to be more favorable in FIG. 3 than in FIG. 2, the veil in FIG. 3 having relatively little contraction beneath the spinner whereas that of FIG. 2 is substantially contracted in this region. The cause of this improvement is not as yet known but may be a result of the increased spinner peripheral speed which in some manner counteracts the constricting effect of the induced air.

Although it is expected that the present apparatus and method can be effectively utilized with any of the glass compositions conventionally employed for producing glass fibers by centrifugal blast attenuation, the glass composition preferably falls within the following ranges:

| | |
|---|---|
| $SiO_2$ | 61 to 72% |
| $Al_2O_3$ | 2 to 8% |
| $Fe_2O_3$ | 0.2 to 1% |
| CaO | 4.7 to 7.5% |
| MgO | 0 to 5% |
| $Na_2O + K_2O$ | 14 to 18% |
| $B_2O_3$ | 0 to 6% |
| F | 0 to 1.5% |
| BaO | 0 to 2.5% |
| $ZrO_2$ | 0 to 2.5% |
| Misc | $\leq 1$ |

The heat transfer characteristics of a fibrous material are usually expressed in terms of its apparent conductivity which is derived essentially from the sum of the conduction of the gas contained in the material, the solid conduction of the fibers and the radiation through the material. For fibrous insulation materials used in a confined space such as blankets of fibrous material used as building insulation, for the temperature ranges encountered, the heat transfer by convection is negligible and can be ignored. The apparent thermal conductivity can thus be expressed as follows:

$$\lambda = A + B(\rho) + C/\rho$$

where
$\lambda$ = apparent conductivity W/m° K.
A = conductivity of the gas
B = Coefficient of conductivity related to the solid part of the fibrous material
C = fiber surface area factor
$\rho$ = density of the fibrous material.

We have found that in the carrying out of the invention, suitable values for these factors are as follows:
$A = 25.89 \times 10^{-3}$
$B = 0.02 \times 10^{-3}$ to $0.2 \times 10^{-3}$, preferably $0.075 \times 10^{-3}$
$C = 0.100$ to $0.300$, preferably $0.190$
$\rho = 8$ to $75$ kg/m$^3$ The apparent conductivity for fibrous insulation materials typically ranges between $30 \times 10^{-3}$ to $55 \times 10^{-3}$ at 24° C. with the fiber fineness ranging between about 2 (5 g) to about 5 (5 g).

Examples of different methods of operating in accordance with the invention are shown in the following table. Example I, which does not correspond to the conditions of the invention, is for comparison purposes. Examples II, III and IV show operations with spinner diameters of 600, 800 and 1000 mm respectively.

| | Example No. | | | |
|---|---|---|---|---|
| | I | II | III | IV |
| Spinner Diameter (mm) | 400 | 600 | 800 | 1000 |
| Pull rate per spinner (metric tons/day) | 20 | 20 | 20 | 20 |
| Burner nozzle width (mm) | 7.7 | 7.7 | 7.7 | 6.5 |
| Burner Pressure (mm water) | 430 | 350 | 400 | 420 |
| Burner temperature °C. | 1500 | 1500 | 1500 | 1500 |
| Fineness (micronaire under 5 g) | 4.2 | 3.5 | 3.0 | 2.5 |
| Density g/m² for R = 2 at 297° K. | 1180 | 990 | 880 | 720 |
| Nominal Thickness (mm) | 80 | 90 | 90 | 90 |

These examples show that for a same pull rate of 20 metric tons per day, the products obtained according to the invention are substantially superior.

In comparing Examples I and II, it can be seen that for the same thermal resistance, the density is smaller according to the invention and also the burner pressure and thus the consumption of energy are also less.

Example III is analogous to Example II with a larger spinner diameter. The fineness and the density are still further improved.

Example IV is another example in which the dimension of the spinner is still further increased. The fineness and the density of the products obtained according to this example are particularly low; in other words, the fibers are very fine and the mass of fibers necessary to obtain a given degree of thermal insulation is greatly reduced.

As indicated above, it has been found, contrary to expectations, that increased spinner peripheral speed as a factor independent of spinner diameter produces a substantial improvement in fiber mat quality and mechanical properties. To achieve these improved results, the peripheral velocity of the spinner should range between about 50 m/s and about 150 m/s and preferably between 50 and 90 m/s.

There has been no satisfactory explanation why it is possible to improve the quality of the products by using a high peripheral speed. It is well known that the attenuation of filaments of material passing from orifices at the periphery of the spinner is a complex phenomenon involving the movement of the spinner and of the stream of gas which entrains the fibers. It is impossible to determine with certainty the role of each of these factors in the fiber attenuation.

It can reasonably be assumed, however, that the fiber is attenuated by a process that can be likened to mechanical drawing, the filament being held at one "end" by the centrifuge and at the other "end" by the friction exerted by the moving gases. In this theory, the relative movement of the two "ends" of the fiber is the result of the combination of the rotary movement of the spinner and the movement of the stream of gas.

As shown in FIG. 8, the path F followed by the filaments on leaving the spinner 10 does appear to show that such a combination of movements is involved in the drawing process. Projection of the path F of the filament into the plane T tangential to the spinner forms an angle with the direction of the gas flow (which is usually parallel to the spinner axis), and it will be found that this angle is in fact a function of the ratio of the peripheral speed of the spinner to the speed of the gases. This is shown in FIG. 9 wherein point O represents a spinner orifice, OP represents the peripheral velocity of the spinner, OG represents the gas velocity, OF the path of the filament (the resultant of vectors OP and OG) and $\alpha$ the angle of the filament with respect to the direction of propagation of gas flow.

Under conventional operating conditions, the angle $\alpha$ is relatively small, on the order of 20° or less, since the speed of the gases is much higher than the peripheral speed of the spinner. Accordingly, an increase in the speed of the spinner should not have a significant effect on the intensity of the fiber attenuation as shown in the broken line OF' in FIG. 9.

Purely geometric considerations should lead to the conclusion that in order to improve drawing of the fibers on the basis of conventional operating conditions an increase of the speed of the gases would be the best solution as shown by the OF" in FIG. 9.

In fact, contrary to expectations, it appears that, with the other conditions unchanged, when the speed of the gases is increased substantially in order to try to obtain extremely fine fibers, products are obtained whose qualities are substantially less satisfactory, and in particular these fibers are very irregular, short and fragile while the insulating blankets or mats prepared with these fibers have poor mechanical and (to some extent) thermal properties.

Furthermore, it has surprisingly been found that very substantial improvements in the quality of the insulating products are obtained if the peripheral speed is increased, all other conditions remaining unchanged.

Although it is desirable to have a high peripheral speed, it is obvious for technical reasons that this speed cannot be increased indefinitely. In practice it is difficult to obtain speeds above 150 m/s and the speed according to the invention is preferably between 50 and 90 m/s.

The peripheral speed is particularly limited by mechanical strength considerations of the spinners used. Although periodic replacement of the spinner is inevitable, the life under the operating conditions according to the invention must remain compatible with the requirements of technical reliability and cost, which are inseparable factors in any industrial undertaking.

Replacement of the spinner under conventional operating conditions is usually necessary after several hundreds of hours of operation. It is important that the spinner life under the operating conditions according to the invention should not be shorter than that with the prior art processes and, if possible, even substantially longer.

A limitation of the speed of rotation—and hence limitation of the stresses experienced by the spinner—without obstructing the above-identified conditions, therefore appears to be particularly desirable for the use of the invention. Taking into account the materials conventionally used, it would appear advantageous not to exceed the limit of 8,000 rpm.

Although the speed of rotation is limited to prevent the spinner from being subjected to excessive stresses, the centrifugal effect must still be adequate to project the material to be formed into fibers from the spinner orifices under satisfactory conditions in respect of output. It is therefore preferable for the speed of rotation to be no less than 800 rpm. The preferred range of rotation speed is between 1000–2250 rpm.

In practice with regard to the choice of a speed of rotation and a peripheral speed, the problems due to the limits of the strength of the equipment usually mean that the highest peripheral speeds are associated with the lowest speeds of rotation, and vice versa. This procedure is not necessarily optimization as regards the formation of the product but is a compromise to ensure that the installation has a reasonable life.

The output of the material through each of the spinner orifices is a very important factor in this type of process. Of course this output directly determines the total production capacity of the spinner. Less obviously, this output per orifice is also a factor which substantially influences the characteristics of the fibers produced.

It will readily be seen that the greater the output per orifice, the more intensive the attenuation must be to obtain a constant fineness.

In light of these practical production requirements, the output per orifice cannot be very low. For a material comprising glass, or a similar material, an output of 0.1 kg/day may be considered as a bottom limit beyond which it is uneconomical to operate. Conversely, an excessive output does not enable very fine fibers to be obtained. For the qualities required of an insulating material the material output is preferably not more than 3 kg/day. Advantageously, the compromises between the production capacity and the quality of the fiber result in the output per orifice being controlled to a value of between 0.7 and 1.4 kg/day.

Under the operating conditions of the invention, the production capacity of the spinner may be increased to very considerable values without the quality of the fibers or of the end product being reduced. Of course it is also possible to keep the production at a lower level, more particularly in order to improve the quality still more.

The production increase, which is an important economic factor, is of particular advantage. It has been the subject of numerous proposals in the prior art: an increasing number of spinner orifices, an increased orifice section, increased material fluidity, and so on. These various elements effectively modify the output of material through the spinner, but the proposals made in this connection have resulted in a reduction in quality or difficulties in respect of the life of the equipment.

Thus an increase in the density of the orifices at the periphery of the spinner, i.e. an increase in the number of orifices per unit area, not only weakens the spinner but, beyond a certain threshold, appears to have an unfavorable effect on the fiber quality. It may be assumed that the primary fibers, which are very close to start with, collide and stick together before their attenuation is complete. This may be why the fibers collected under these conditions are less uniform, less fine and shorter.

A problem of the same kind is encountered when—again to increase production capacity—the orifice section is increased while maintaining identical viscosity conditions of the material formed into fibers. In this case the primary fibers are coarser and it is difficult to obtain satisfactory drawing even if the conditions of the annular attenuating gases are modified.

An increase in the fluidity for a given material, i.e. an increase in its temperature, gives rise to other problems. The operating temperatures are usually at the limit of what the spinner alloy can withstand. The nature of the composition to be formed into fibers is also often selected so as to allow for this type of limitation. It is impossible to increase the temperature on this hypothesis unless the spinner is made from precious metals, and this gives rise to other difficulties, particularly in respect of costs, but also mechanical characteristics.

An increase in fluidity can also be obtained by using materials of a composition such as to achieve this result, but these compositions have the disadvantage of being substantially more expensive.

Accordingly, prior art methods selected to improve the fiber quality generally resulted in reduced productivity.

With the present invention, although there is still a quality/quantity balance to resolve, the result is at a much more satisfactory level. Thus if good quality production is the objective comparable to that produced previously with centrifugal processes, a production on the order of 12 tons of fiber material per day per spinner is readily exceeded.

In practice, it appears advantageous according to the invention to maintain production at a level above 17 tons per day, and production of 20 to 25 tons or more can usefully be achieved while maintaining a product of excellent quality.

It is noteworthy that these improved results can be achieved without the use of the spinner modifications discussed above. There is no need to change the orifice density nor the orifice dimensions etc. The primary fibers formed are therefore as a whole comparable to those of the similar prior art processes, but since fiber attenuation is improved, the quality of the product is better.

Attenuation of the fibers by the currents of gas is carried out by means of a blast generator, the annular orifice of which is situated in the immediate vicinity of the spinner. The gas flow is of a certain width so that the filaments projected from the spinner remain fully immersed in this flow of gas and are therefore kept under the conditions adapted to their drawing.

The width of the flow at the start actually depends on the exact geometric configuration of the fiber-forming system. For a given arrangement, the useful variations are relatively limited inasmuch as to reduce the energy expenditure it is necessary to reduce the width of the gas flow as much as possible.

In conventional systems the width of the flow of gas is of the order of 0.3 to 2.5 cm.

The pressure of the gas emitted under these conditions is between 100 and 1,000 mm water column for an emission width less than 2 cm, and is preferably from 200 to 600 mm water column for an emission width lower than 1.5 cm.

In analyzing hereinabove the respective effects of the peripheral speed, the material output, and the pressure of the drawing gases, it is necessary to point out that in practice these various parameters together affect the quality or cost of the resulting products. Relationships can be drawn between these various parameters to allow for the most advantageous operating conditions proposed by the invention.

Also, independently of these operating conditions, these relationships must include an index of the quality of the product obtained. In this way these relationships enable a clear distinction to be made between the operating conditions according to the invention and those of the prior art.

Thus, according to the invention, the peripheral speed v of the spinner orifices, expressed in meters per second, the mass of material q passing through each orifice in the spinner, expressed in kg per orifice and per day, and the pressure of emission p of the drawing gas expressed in mm water column for an emission width of at least 5 mm and maximum 12 mm are so selected that the ratio qv/p is between 0.07 and 0.5 and preferably between 0.075 and 0.2. It is noteworthy that the numerator of this ratio includes factors the increase of which tend to spread the fiber veil while the denominator recites a factor the increase in which tends to restrict the veil. A better "umbrella" fiberization and a higher quality fiber can accordingly be expected with high values of the qv/p ratio.

At this point in the description and before examining the examples of implementation and of products obtained, it is necessary to specify the parameters which characterize the products in order to better understand the nature of the improvements brought by the invention.

For this purpose, the production of insulating materials constituted by a fiber blanket or mat will mainly be considered. These products alone represent a considerable part of all the applications of mineral fibers. Of course, that does not exclude the implementation of the invention for the preparation of products intended for other uses.

As already stated, the two main properties required are thermal insulating properties and mechanical properties. The latter relate to quite specific aspects of the insulating products. In addition, the product should lend itself to the handling and packing techniques required of voluminous products of low specific gravity.

For a given product, the principal insulating property is defined by its thermal resistance R. This expresses the capacity of the product in question to withstand heat changes when the product is subjected to different temperatures on either side. This value depends not only on the characteristics of the fibers and their arrangement within the product, but also on the product thickness.

The thicker a product, the greater its thermal resistance. If, therefore, the thermal resistances of different products are to be compared, the thickness of these products must be specified. We shall see hereinafter that the question of thickness is closely bound up with the mechanical properties of the products. The literature also occasionally refers to thermal conductivity, a magnitude which disregards the product dimensions. It is to some extent an intrinsic measurement of the insulating quality. In practice, however, it is the thermal resistance that is most frequently used to characterize the products. It is therefore this magnitude that we use in the examples. Despite numerous studies carried out on this subject, it is still impossible to establish a complete correlation between the thermal resistance, or the thermal conductivity, and the measurable data concerning the structure of the product. Nevertheless, some considerations enable the production to be oriented according to the required result.

Thus a larger quantity of fibers for a given covered area enables the insulating properties to be increased, but this increase is accompanied by an increasing cost. Wherever possible, therefore, it is advantageous to have a given thermal resistance with a minimum number of fibers. A comparison of the specific weight, i.e. the mass of fibers per unit area for different products of the same thermal resistance, gives a measurement of their respective qualities. The quality of the product in this case varies in inverse proportion to the specific weight.

It has also been established that the fineness of the fibers is an important factor in respect of the formation of the insulating qualities. For a given specific weight, the insulating properties of a product are all the greater the finer the fibers.

The mechanical magnitudes of use for an assessment of the product are essentially bound up with the problem of its packing. The reason for this is that the products are very bulky and are advantageously stored in the compressed state. Nevertheless, the compressed product must resume a certain bulk once it has been released in order to develop its insulating qualities to the maximum.

Before compression, the fiber mat itself assumes a certain thickness which is different from the thickness before compression and from the thickness in the compressed state. It is desirable that the thickness resumed after unpacking should be as large as possible to obtain a product having good thermal resistance.

More specifically, for an unpacked product of standardized characteristics, and particularly of guaranteed thickness, it is important that it should occupy a minimum volume in the compressed state. This guaranteed thickness resumption is also expressed by the admissible compression ratio.

It is difficult to establish a close relationship between the mechanical and the insulating qualities of a product, even if the attempt is made to analyze them in terms of structure, fiber dimensions, and so on. Experiment simply shows that the improvement of the insulating qualities is compatible with the improvement of the compression ratio.

1. Comparative tests

Three comparative tests were carried out to show the advantage of using the operating conditions specified by the invention as compared with the prior art operating conditions. Although a varietey of factors are likely to influence the quality of the final poroduct, as far as possible, an attempt has been made in these tests to find operating conditions which enable the parameters sensitive to various influences to be kept constant.

The following table summarizes the various characteristics and the results obtained in respect of the prepared product. Tests I, II and III were carried out under operating conditions not equivalent to the invention, while test IV was carried out under conditions in accordance with the invention.

|  | I | II | III | IV |
|---|---|---|---|---|
| Peripheral speed (v) | 38 | 38 | 38 | 56.5 |
| Output per orifice (q) (kg/day) | 1.1 | 1.30 | 1.16 | 1.1 |
| Pressure (p) (mm water column) | 758 | 1020 | 650 | 470 |
| qv/p | 0.055 | 0.048 | 0.068 | 0.13 |
| Micronaire fineness at 5 g (F) | 3 | 3 | 4.5 | 3 |
| Total centrifuge output (tons per day) | 9 | 18 | 18 | 18 |
| Specific weight for $R = 2$ (g/m$^2$) | 948 | 1080 | 1215 | 945 |
| Compression ratio | 4 | 2 | 4 | 4 |
| Tensile strength (g/g) | 250 | 150 | 250 | 250 |

The quality of the products prepared is defined in this Table by the specific weight required for a given thermal resistance for a likewise given thickness. As a reference we chose the thermal resistance of 2 m$^{2\circ}$ K/W measured at 297° K for a thickness of 90 mm. These conditions are equivalent to a standard insulant.

The compression ratio is the ratio of the guaranteed nominal thickness after 3 months' storage in the compressed state to the thickness of the compressed product.

The tensile strength is measured to the ASTM standard C 686-71 T.

Several conclusions can be drawn from the above Table.

For example, a comparison of test IV according to the invention and test II shows that for a constant product fineness and the same total centrifuge output, the conditions specified by the invention give a better quality product (lower specific weight), a substantially improved compression ratio and better tensile strength.

For a given quantity of fiber material, the improvement found in the specific weight enables the quantity of product to be increased by about 10% or more. The improvement of the compression ratio gives a very considerable saving in respect of transport and storage costs.

If, as in the case of Examples I and IV, the operating conditions are adjusted to have the same product qualities, it will be found that the centrifuge output in the method according to the invention is increased in considerable proportions, thus making the process decidedly more cost-effective.

Another way of comparing the invention with the prior art methods is to establish conditions such that the output and mechanical qualities are identical. In that case, as in Examples III and IV, the conditions according to the invention given an appreciable reduction in the fiber fineness, showing that the fibers produced are finer, and that is why the specific weight is lower for the same thermal resistance.

No matter how the procedure according to the invention is considered, it provides an appreciable improvement over the prior art methods, as confirmed by the results of the following tests carried out under other operating conditions.

2. Tests in respect of variations of various parameters

Various other parameters were modified according to the required product qualities while remaining in the conditions according to the invention.

The results of these tests are given below:

|  | V | VI | VII | VIII | IX |
|---|---|---|---|---|---|
| Peripheral speed (v) m/s | 56.5 | 56.5 | 75 | 56.5 | 71 |
| Output per orifice (q) (kg per day) | 1 | 0.9 | 0.7 | 1.25 | 1 |
| Pressure (p) (mm water column) | 160 | 325 | 270 | 440 | 300 |
| qv/p | 0.35 | 0.15 | 0.19 | 0.16 | 0.2 |
| Total centrifuge output (tons/day) | 18 | 18 | 18 | 25 | 20 |
| Specific weight for $R = 2$ (g/m$^2$) | 1080 | 945 | 915 | 1140 | 865 |
| Compression ratio | 4 | 4 | — | 3 | 4 |
| Tensile strength (g/g) | 300 | 250 | — | 250 | 250 |

Example V is an embodiment under the conditions of the invention to prepare a product comparable to that of Example IV. The mechanical properties are fully retained. The micronaire fineness goes from 3 to 4, i.e. the fibers are slightly less fine. The specific weight is thus slightly greater.

The type of production corresponding to Example V is advantageous although the products have a higher specific weight than those in Example IV, because under identical centrifugation conditions the change of the fiber fineness is due to differences in the operation of the burner emitting the hot attenuating gases. The energy consumed for operation of the burner in the case of Example V is considerably reduced by comparison with Example IV, and this can usefully make up for the increase in specific weight.

Although it is impossible to give an exact comparison because the fiber fineness is not strictly the same in both cases, extrapolation shows that for a 4.5 micronaire fineness the specific weight in the conditions of Example V would be less than that of Example III. This confirms what is apparent from a comparison of Examples II and IV, i.e., that the quality of the insulating products produced according to the invention is better than that of the products obtained in the prior art conditions, even if this difference is greater for the finest products.

Example VI is a similar embodiment to Example IV but with the peripheral speed maintained and the speed of rotation reduced. The properties of the products are identical except for experimental approximations.

Example VII is also interesting on the same lines. The influence of the peripheral speed on the quality of the prepared insulating product is again clearly apparent from the specific weight.

Example VIII relates to a test for an output of 25 tons per day, which does not represent a limit for the method according to the invention but which very clearly distinguishes it from the prior art systems in this area when good quality fibers are required. The micronaire fineness is still relatively low and so is the specific weight, although slightly higher than Example V.

The remarkable increase in production thus obtained amply makes up for this slight increase in specific weight required to achieve the desired insulating properties.

Example IX is another embodiment of the invention distinguished both by a high peripheral speed and a relatively low speed of rotation. These conditions enable excellent mechanical and insulating qualities to be achieved (the specific weight is particularly low) for a high centrifuge output.

3. Tests with constant qv/p ratio

These tests were carried out with a 300 mm diameter spinner having 11 500 orifices.

The output per orifice was kept constant and at the same time the peripheral speed and the pressure of the burner were increased approximately in the same proportions to maintain a substantially constant qv/p ratio.

The following table shows the results for four operating conditions:

|  | X | XI | XII | XIII |
|---|---|---|---|---|
| Peripheral speed (v) | 68 | 76 | 85 | 100 |
| Output per orifice (q) (kg per day) | 1 | 1 | 1 | 1 |
| Pressure (p) (mm water column) | 410 | 460 | 510 | 600 |
| qv/p | 0.165 | 0.165 | 0.166 | 0.166 |
| Micronaire fineness at 5 g (F) | 4.0 | 3.5 | 3.0 | 2.5 |
| Total centrifuge output (tons/day) | 11.5 | 11.5 | 11.5 | 11.5 |

This Table shows that in the conditions according to the invention, variation of the variables v and p for a given unit output enables the fibers to be made finer in certain limits while at the same time increasing the peripheral speed and burner pressure, i.e. the speed of the gases. The result is a very substantial reduction of micronaire fineness and hence the useful specific weight. It is also possible to obtain a micronaire fineness as low as 2 for a material output remaining relatively high.

A similar experiment but holding the burner pressure constant shows that the unit output and hence the total output of the system must be substantially reduced to obtain a very low micronaire fineness.

The same spinner was used in this series of tests.

|  | XIV | XV | XVI | XVII | XVIII |
|---|---|---|---|---|---|
| Peripheral speed (v) | 63 | 72 | 81 | 90 | 108 |
| Output per orifice (q) (kg per day) | 1.3 | 1.14 | 1.0 | 0.9 | 0.76 |
| Pressure (p) (mm water column) | 410 | 410 | 410 | 410 | 410 |
| qv/p | 0.20 | 0.20 | 0.20 | 0.20 | 0.20 |
| Micronaire fineness at 5 g (F) | 4.5 | 4.0 | 3.5 | 3.1 | 2.7 |
| Total centrifuge | 15 | 13 | 11.5 | 10.3 | 8.8 |

-continued

| | XIV | XV | XVI | XVII | XVIII |
|---|---|---|---|---|---|
| output (tons/day) | | | | | |

The above two experiments, in the first of which the peripheral speed and the pressure are simultaneously increased and the second in which the peripheral speed is increased and the material output is reduced in order to increase the insulating qualities of the product, do not give completely equivalent results.

It has been found that the mechanical qualities of the resulting mats are substantially better in the case of products obtained with a low burner pressure, as indicated previously.

These differences are due to a better quality of the fiber produced for a relatively moderate drawing effect of the stream of gas as compared with that resulting from the rotation of the centrifuge.

In the foregoing examples we have shown, by certain comparisons, differences in respect of the manufactured products, and we have pointed out that these differences affect the production costs. It is difficult to exactly evaluate the economic gain provided by the invention industrially. Approximately, taking into account the various factors involved, such as energy, product and equipment, the estimated saving may be as much as 10% of the unit cost or more depending upon the conditions selected.

During these tests analyses were carried out to try to determine the features of the fibers produced according to the invention as compared with fibers produced by the prior art in order to try to give details of the improvements found, particularly by evaluating the fiber fineness for determination of the micronaire fineness. Apart from this indirect approach it is difficult to determine the characteristics of the fibers, and particularly their length.

However, a number of findings lead to the conclusion that the operating conditions according to the invention promote the formation of longer fibers. There is the improved tensile strength. There is also the ability of the products to withstand a higher compression ratio and the thickness of the fiber mat leaving the receiving chamber before entering the thermal processing chamber for the binder. The conditions according to the invention give a substantial thickness increase, which may be as much as or more than 25% while the other conditions, more particularly material output, remain identical. All these aspects to some extent may be associated with an increase in fiber length.

With regard to the physical characteristics of the blanket or mat, the presence of unfiberized particles in the mats is undesirable. Each one of these particles has a significant material mass, when compared to that of a fiber. Related to the material mass, the contribution of an unfiberized particle to the establishment of the insulating properties is quite inferior to that of a normal fiber. In other words, for a certain volume of fibrous material, a mat without unfiberized particles is better insulation than a mat containing the unfiberized particles.

Furthermore, the presence of unfiberized particles is usually accompanied by a profound lack of homogeneity of the characteristics of all the fibers, another unfavorable factor for the quality of the mat product.

For these reasons the absence of the unfiberized particles, or at least very low amounts, are particularly desirable, whatever fiber-production method is considered. In general, the techniques for production by centrifugal blast attenuation, the spinner acting as a bushing, are known to result in very low amounts of unfiberized particles. The present invention has the ability to produce mats of which the unfiberized amounts are even lower.

By definition, unfiberized particles are qualified as all the particles having dimensions which are much greater than the average diameter of the fibers. The unfiberized particles are also characterized by a low ratio of length to the diameter. Usually, any particle having a diameter greater than 10 times the average diameter of the fibers can be considered as unfiberized.

The percentage of unfiberized particles in the products according to the invention is less than 1% and preferably less than 0.80% by weight.

Still according to the invention, the percentage of unfiberized particles of which the dimensions are equal to or greater than 20 times the average diameter is less than 0.30% by weight of the entire mat.

The average diameter varies according to the nature of the products prepared so that the size of the so-called unfiberized particles also varies. For the mats intended for insulation, and prepared by techniques such as those contemplated by the invention, the diameter of the fibers varies from about 1 to 20 micrometers and, more simply, any particle with a diameter of greater than 40 micrometers can be considered unfiberized.

Following this definition, the mats according to the invention are distinguishable from the mats previously obtained by analogous techniques in that they contain at most 1% by weight of particles having a diameter of greater than 40 micrometers. This amount is preferably less than 0.08%.

The detail for the classification method of the fibers and particles is specified further on in the examples.

Given that the measurement is made ponderally and that the unfiberized particles are heavier by nature than the fibers, the number of unfiberized particles is very low.

In the products according to the invention, it is again appropriate to state that the amount unfiberized is relatively small in relation to those which are observed in products prepared according to other techniques. The granulometric study shows in effect that the ponderal percentage of particles of which the dimension is greater than 80 micrometers is less than 0.3%.

In the products according to the invention practically no particles exist having a diameter greater than 100 micrometers.

As indicated above, the absence of unfiberized particles is usually associated with an excellent homogeneity in the fiber characteristics. This homogeneity can be determined, for example by the variations in diameter of the fibers. For example, the typical deviation in the diameter of the fibers is measured on the histogram of a mat specimen, that is, the difference between the extreme diameters, the interval of which is 68% of all the fibers.

The coefficient of variation, that is the relation of the typical deviation to the average diameter for the specimen considered, is a measurement of the dispersion of the fiber characteristics.

On this point also, the mats according to the invention compare advantageously with the previous, known mats. The coefficient of variation is less than 0.85 and preferably less than 0.60 and can be as low as 0.5. In other words, the histogram of the fibers in the mats according to the invention is very contracted.

A visual observation of the fibers in the mats according to the invention shows a structural regularity substantially better than that of the fibers in the traditional mats prepared by analogous centrifugation techniques. The surface of the fibers seems smoother, the section of the fibers is more constant, the deformed fibers—essentially re-glued fibers—are less numerous, etc. . . . Of course, these differences are difficult to quantify. They are, however, a useful confirmation of the noted advantageous structural characteristics of the fibers constituting the mats according to the invention.

The mats according to the invention are also distinguishable by the length of the fibers from which they are formed. The direct measurement of the length of the fibers is an operation which comes up against great difficulties. The handling of the fibers causes ruptures which are a source of errors. Furthermore, only statistical data is significant. This necessitates the taking of many measure- ments.

To prevent these difficulties, an indirect method for the measurement of the length of the fibers consists of measuring a volume of sedimentation of the fibers suspended in water. The systematic studies conducted on these types of measurements show that for a specifimen of a given mass, the volume of sedimentation increases with the length of the fibers from which it is formed. In effect, it is understood that the aleatory deposit causing the entanglement of the fibers is looser when the fibers are longer.

Furthermore, the volume of sedimentation is a function of the diameter of the fibers. The finer the fibers, and therefore for a same mass they are more numerous, the greater the volume.

In reduced-value areas it could be considered that the volume is approximately proportional to the length and, inversely, proportional to the diameter of the fibers.

This method is generally designated by the term "bulking". It is conveniently used and enables relative determinations of all the fibers of the specimen studied.

The measurements are made on fibers of which the length was previously reduced by limited grinding under well-determined conditions. The grinding leads to fibers of a few millimeters length. However, this length remains a function of the initial length.

The height or volume measurements of sedimentation are established in relation to fibers of which the initial characteristics are known. Furthermore, the bulking method is also a way of judging the mechanical strength of the fibers in ratio to the grinding operation. Of course, fragile fibers will lead to relatively low volumes of sedimentation after the grinding, even if they are long at the start. This method of measuring constitutes an overall appreciation of these two properties, namely, length and strength.

The considerable increase in the volume of sedimentation observed for the mats according to the invention necessarily conveys a simultaneous improvement of the length and strength of the fibers. The quality of the fibers forming the mats according to the invention was considered above. Obviously, the improvements stated concerning the fibers also influence the properties of the mats, mechanical or insulating.

The comparisons with the known products are difficult to make due to the very numerous parameters which contribute to the production of these properties.

Traditionally, the insulating mats are classified commercially as a function of their thermal resistance R. This thermal resistance is a function of the fineness of the fibers F, of the mass of fibers per surface unit or "specific weight" m, but also of the thickness of the mat and of the fiber qualities indicated above.

The diminution of the specific weight in the case of the mats according to the invention indicates both the better regularity of the fibers and the absence of unfiberized particles, but also, a better homogeneity of the fiber distribution in the mat.

To significantly define the specific weight of the mats, it is necessary to specify on one side the thermal resistance of the mat R and the thickness e. These factors are interrelated by the expressions:

$$m/R = m/e \times \lambda$$

$$m/R = m/e \, (A + B\rho + c/\rho)$$

$$m/R = \rho A + B\rho^2 + C.$$

In these expressions $\lambda$ is the thermal conductivity and $\rho$ is the volumetric mass of the mat.

For the mats considered, the volumetric mass $\rho$ being very low, the $B\rho^2$ factor can be disregarded at first approximation:

$$m/R = \rho A + C.$$

When m is expressed by $kg/m^2$, R by $m^2 \cdot K/w$ at 297° K. and $\rho$ by $kg/m^3$ the mats according to the invention are such that:

$$m/R \leq 0.026\rho + 0.2$$

Indicatively, for mats according to the invention of which the volumic mass is $10 \, kg/m^3$, the fibers have a fineness of 3 (under 5 g), for a thermal resistance of 2 $m^2 \cdot °K/w$ by order and the specific weight can be on the order of or less than 920 $g/m^2$.

The advantages associated with a lower specific weight in producing the insulating mats are obvious. With the same volume of fibers, the quantity of mat produced is increased; the production cost is therefore lower.

The improvement of the mats according to the invention is also noticeable on the mechanical level. This is especially the case of the tensile strength which is measured according to the standard ASTM-C 681-76. According to this standard, rings of specified size are cut in the mat. These rings are placed on two cylindrical traction bars. They are subjected to increasing force. The force exerted at rupture is measured. To obtain comparable results, the force exerted is related to the weight of the specimen.

The mats according to the invention bonded with a phenolic binder representing at most 4.5% by weight of the finished product offer a tensile strength preferably at least equal to 200 gf/g longitudinally, that is, when the rings are cut their length is extended in the same direction as the mat product prepared.

The improvement of the tensile strength in relation to conventional mats can also be attributed to the presence of longer, more regular and better distributed fibers. In particular, it is understood that the longer fibers improve the network structure of the mat. Furthermore, it is obvious that the fibers, of which the structure is more regular, and of which for this reason it can be thought that, individually, it has a greater strength, (the measurements made fiber to fiber, but in too small a number to be transposable to all the fibers of the mat, showed an increase in the tensile strength) lead to an improvement of the tensile strength of the mat.

The mats according to the invention as a result of the improvement of their mechanical properties are also adapted without difficulty to a significant compression. In order to stock and transport these voluminous products of low mass, it is necessary, in effect, to have them compressed. So that these mats then recover their good insulating capacity, they must be restored to their original thickness, even after three months in compression. The mats according to the invention can satisfactorily undergo compression rates greater than or equal to 5 and which can be raised in certain cases to 7 or 8, thus showing that the high regular fibers of which they are formed lend themselves to significant deformation without breaking.

The mechanical properties of the fibers forming the mats according to the invention also are indicated indirectly by the dust content of these mats. Dust is defined by all particles not fixed to the mat and which can become detached from the latter without being subjected to efforts beyond the framework of a normal implementation. The presence of dust in the mat mainly results from the breaking of insufficiently strong fibers during the conditioning of the mat (cutting, rolling, compressing, etc. . . . ).

The conditions of the dust measurement are described in the examples. These measurements significantly show a very low amount of dust for the products according to the invention. The amount of dust is less than 0.1 mg/m$^2$. The absence of dust is an advantage to the user of the product and such a product is always preferred.

The regularity of the distribution of the fibers in a mat according to the invention is important, and the mat should be as homogeneous as possible. So that the insulation is effective, the mat must not have zones wherein the fibers are less abundant.

The fiber distribution can be determined by measuring the resistance which the mat presents to air circulation. The examples will show that on this point also the mats according to the invention offer advantages. Especially for a volumic mass of 10 Kg/M$^3$, the resistance measured according to the standard ISO-DIS-4630 is greater than 4 Rayl/cm; for a volumetric mass of 20 Kg/m$^3$, it is greater than 10 Rayl/cm.

To obtain fibers and mats having the properties indicated above, the centrifugal blast attenuation is effected while maintaining the peripheral speed of the spinner at greater than 50 m/s. This speed can be established with spinners of various diameters. To produce the fibers in economical quantities, it is preferable to operate with spinners of which the diameter is substantially greater than 500 mm, preferably in the range of 600–1500 mm.

Although the precise reasons for the improvement in the fibers and fiber mat are not known, it is assumed that the fibers during their formation and for various reasons have less of a tendency to collide against each other before being solidified. For this reason, the fibers are longer overall and their properties are better. It is also possible that, under the conditions followed, the forces acting on the fibers are more regular and, as a consequence, the attenuation is developed more progressively with less filament ruptures or ruptures later on.

Regardless of the reasons, substantial improvements of the qualities of the products are effectively ascertained, as is shown in the following examples.

The following comparison is made with two commercial products, designated below by A and B. These two products are prepared like the mats of the invention by centrifugation of the material forming the fibers through the orifices of a spinner and attenuation by a gas current.

The factors studied lead to the following results.

1. Determination of the Unfiberized Amount

The specimen analyzed is first rid of the binder which it contains. It is subjected to a limited grinding in order to dissociate the unfiberized particles from the fibers to which they are ordinarily attached.

The fibers are then separated from the unfiberized particles by entrainment in water in a separating column traversed by an ascending current of water.

The unfiberized particles are recovered at the bottom of the column. They are dried and sifted on vibrating screens arranged in series which retain the unfiberized particles, the dimensions of which are respectively greater than 100, 80 and 40 micrometers.

The results expressed in percentage by weight of the initial specimen are as follows:

| Unfiberized Particles | A | B | Invention |
| --- | --- | --- | --- |
| $40 \times 10^{-6}$ m | 1.7 | 1.9 | 0.63 |
| $80 \times 10^{-6}$ m | 1.3 | 1.6 | 0.15 |
| $100 \times 10^{-6}$ m | 0.3 | 1.3 | 0.05 |

The mats according to the invention are distinguishable by the very low unfiberized amount and also by the small size of the residual unfiberized particles.

The systematic errors introduced particularly by the method for separating the fibers and the unfiberized particles are negligeable.

2. Histogram of the Fiber Diameters

Numerations are made on the specimens of the mats of example 1. From these numerations, as a function of the diameter measured, the corresponding histogram is established, then the average diameter, the typical deviation and the coefficient of variation for each mat specimen. In these measurements of diameter, the unfiberized particles are not taken into consideration.

The results are the following:

|  | A | B | Invention |
| --- | --- | --- | --- |
| average diameter ($10^{-6}$ m) | 5.3 | 2.9 | 4.5 |
| typical deviation ($10^{-6}$ m) | 3.4 | 2.7 | 2.5 |
| coeff. variation | 0.64 | 0.93 | 0.5 |

The small extent of the typical deviation in the case of the invention is especially remarkable in as much as the fibers on an average for the specimen considered are finer than those of product A. This shows, indeed, a nicely contracted histogram. In other words, the fibers of the mats according to the invention have a relatively constant diameter.

3. Estimation of the Lengths of the Fibers (Bulking)

The specimens of 5 g of unsized fibers, after passing through an oven at 450° C., are ground for 10 seconds in 500 cm$^3$ of distilled water.

After grinding, the aggregate of the water and the fibers is decanted in a graduated cylinder of 1000 cm³ and allowed to settle for 5 minutes (sedimentation practically achieved).

At the end of the sedimentation the top level of the column of fibers is measured in millimeters. These measurements are repeated at least three times to obtain an average value.

The results of these measurements are reported in the following table:

|  | A | B | Invention |
|---|---|---|---|
| height after 3 min. (mm) | 41 | 128 | 150 |
| height after 5 min. (mm) | 39 | 127 | 149 |

The preceding table shows that the products according to the invention are formed from fibers substantially longer and/or more resistant than those of the analogous mats A and B.

4. Mass per Surface Unit

The specific weight or mass per surface unit of the various mats and their thermal resistance are set forth in the following table:

|  | A | B | Invention |
|---|---|---|---|
| m g/m² | 1000 | 1350 | 915 |
| Rm² °K./W | 2 | 2 | 2 |
| m/R | 500 | 675 | 457 |

The mats according to the invention require fewer fibers to produce the same insulating quality.

5. Pull Resistance (ASTM-C-681.76)

The specimens are cut ring-shaped by stamping. Their dimensions are as follows:

| total length: | 122 mm, |
|---|---|
| length between axes: | 46 mm, |
| radius of the cavity: | 12.5 mm, |
| outside radius: | 38 mm. |

Each specimen is weighed and then placed on a testing machine containing two cylindrical shafts 25 mm in diameter. The velocity of the movable shaft bearing the ring is 200 mm/min. The force at breaking is measured and the ratio of this force to the specimen mass is determined.

The measurements are made for the cut specimens first longitudinally to the mat, and then transversely.

The results are as follows, expressed in gf/g:

|  | A | B | Invention |
|---|---|---|---|
| Longitudinal resistance | 164 | 148 | 214 |
| Transverse resistance | 159 | 136 | 183 |

In both directions, the pull resistance of the mats according to the invention appears superior to the comparative mats.

6. Dust Content

The measurement of the dust content is made on specimens of 800×400 mm. These specimens are suspended vertically from a vibrator on the inside of a cabinet. The vibrator frequency is 50 Hz and its range is 2.5 mm. The vibration is maintained for 2 hours. The particles which become detached from the specimen are recovered at the bottom of the cabinet. These particles are weighed and their mass is related to the open surface of the mat sections.

Only the surface of the sections made in the thickness of the mat are taken into account in this measurement. In effect, almost all of the particles which become detached come from these surfaces. In effect, they have undergone the hardest constraints, especially during the cutting. Furthermore, as a result of the smoothing effected during the treatment of the mat in the oven, the top and bottom sides of the mat allow practically no dust to pass.

For the mat A, an emission of 0.16 g/m² of section is found. This value is only 0.07 g/m² for the mat according to the invention.

7. Air Permeability

The determination of air permeability, which is an indication of the fiber distribution, is measured according to the standard ISO-DIS-4638.

According to this standard, an outflow of air is created through a test tube containing a product specimen. The measurement of the drop in pressure between the two open ends of the tube measures its permeability.

Measurements were made on products having two distinct volumetric masses (10 and 20 kg/m³). The results are set forth in the following table. They are expressed in CGS units by Rayl/cm.

| kg/m³ | A | B | Invention |
|---|---|---|---|
| 10 | 3 | 3 | 4.8 |
| 20 | 9 | 7.5 | 12 |

The good performance of the mats according to the invention are confirmed by a simple observation. The fibers are arranged in a well-stratified manner and no zone appears having a lesser fiber content.

Under these conditions and considering the fiber qualities noted above (regularity, absence of unfiberized particles, etc. . . . ), the better resistance to the passage of air appears quite coherent with the other results reported, particularly the improvement of the thermal resistance for the same specific weight (or that which is equivalent, the obtainment of the same thermal resistance for a lower specific weight).

8. Pressure Resistance

Light mats, with thermal resistance of 2 m²°K/W of which the nominal thickness guaranteed to the user is 90 mm, were compressed into roll form. In these rolls the thickness of the mat was only a fraction of the nominal thickness.

The maximum rate of compression (ratio of the nominal thickness to the thickness at the compressed state) which, after four months at the compressed state enables recovery to the nominal thickness, was determined for the products according to the invention and for products A and B.

The results are the following:

|  | A | B | Invention |
|---|---|---|---|
| Compression | 4 | 4 | 5 |

|   | A | B | Invention |
|---|---|---|---|
| Rate |   |   |   |

The results show that the mats according to the invention have a higher pressure resistance. These results are even better when the specific weight of the product according to the invention is lower than that discussed above.

We claim:

1. A method for centrifugally producing glass fibers from a glass composition as follows:

| | |
|---|---|
| $SiO_2$ | 61 to 72% |
| $Al_2O_3$ | 2 to 8% |
| $Fe_2O_3$ | 0.2 to 1% |
| CaO | 4.7 to 7.5% |
| MgO | 0 to 5% |
| $Na_2O + K_2O$ | 14 to 18% |
| $B_2O_3$ | 0 to 6% |
| F | 0 to 1.5% |
| BaO | 0 to 2.5% |
| $ZrO_2$ | 0 to 2.5% |
| Misc | $\leq 1\%$ | said method comprising the steps of introducing the glass in molten attenuable condition into a spinner for delivery to the interior surface of the peripheral wall thereof, said peripheral wall having a multiplicity of orifices therein, rotating said spinner to effect the centrifugal delivery of the glass through the spinner orifices in a multiplicity of streams, and attenuating said glass streams into fibers by means of an internal combustion burner providing a generally downwardly directed annular gaseous blast adjacent the exterior of said peripheral wall, said gaseous blast having an elevated temperature contributing to the maintenance of the glass streams in attenuable condition for a time sufficient to effect attenuation thereof, and wherein centrifugal acceleration at the spinner wall, the diameter of the spinner, the peripheral velocity of the spinner and the burner pressure fall within the following ranges:

| | |
|---|---|
| centrifugal acceleration | 4000 m/sec$^2$ to 20,000 m/sec$^2$ |
| Spinner diameter | 550 mm to 1500 mm |
| peripheral velocity | 50 m/s to 130 m/s |
| burner pressure | 100 mm to 900 mm (water column). |

2. The method as claimed in claim 1 wherein the diameter of the spinner, the peripheral velocity of the spinner and the burner pressure fall within the following ranges:

| | |
|---|---|
| spinner diameter | 550 mm to 1500 mm |
| peripheral velocity | 55 m/s to 90 m/s |
| burner pressure | 200 mm to 600 mm (water column). |

3. The method as claimed in claim 1 wherein the diameter of the spinner, the peripheral velocity of the spinner and the burner pressure fall within the following ranges:

| | |
|---|---|
| spinner diameter | 600 mm to 1000 mm |
| peripheral velocity | 55 m/s to 90 m/s |
| burner pressure | 300 mm to 500 mm (water column). |

4. A method for centrifugally producing glass fiber insulating blanket from a glass composition as follows:

| | |
|---|---|
| $SiO_2$ | 61 to 72% |
| $Al_2O_3$ | 2 to 8% |
| $Fe_2O_3$ | 0.2 to 1% |
| CaO | 4.7 to 7.5% |
| MgO | 0 to 5% |
| $Na_2O + K_2O$ | 14 to 18% |
| $B_2O_3$ | 0 to 6% |
| F | 0 to 1.5% |
| BaO | 0 to 2.5% |
| $ZrO_2$ | 0 to 2.5% |
| Misc | $\leq 1\%$ | said method comprising the steps of introducing the glass in molten attenuable condition into a spinner for delivery to the interior surface of the peripheral wall thereof, said peripheral wall having a multiplicity of orifices therein, rotating said spinner to effect the centrifugal passage of the glass through the spinner orifices in a multiplicity of streams, and attenuating said glass streams into fibers by means of an internal combustion burner providing a generally downwardly directed annular gaseous blast adjacent the exterior of said peripheral wall, said gaseous blast having an elevated temperature contributing to the maintenance of the glass streams in molten condition for a time sufficient to effect attenuation thereof, wherein the spinner diameter, the centrifugal acceleration at the spinner peripheral wall, the peripheral velocity of the spinner and the burner pressure fall within the following ranges:

| | |
|---|---|
| spinner diameter | 550 mm to 1500 mm |
| centrifugal acceleration | 4000 m/sec$^2$ to 20000 m/sec$^2$ |
| peripheral velocity | 50 m/s to 130 m/s |
| burner pressure | 100 mm to 900 mmm (water column) | thereby producing fibrous insulation blanket having the following characteristics:

| | |
|---|---|
| fineness | 2(5 g) to 5(5 g) micronaire |
| conductivity | $30 \times 10^{-3}$ to $55 \times 10^{-3}$ (W/m °K.) |
| density | 8 to 75 (Kg/m$^3$). |

* * * * *